No. 764,888. PATENTED JULY 12, 1904.
A. A. GORDON, Jr.
SHUTTLE BOX MOTION FOR LOOMS.
APPLICATION FILED APR. 30, 1904.
NO MODEL. 4 SHEETS—SHEET 1.
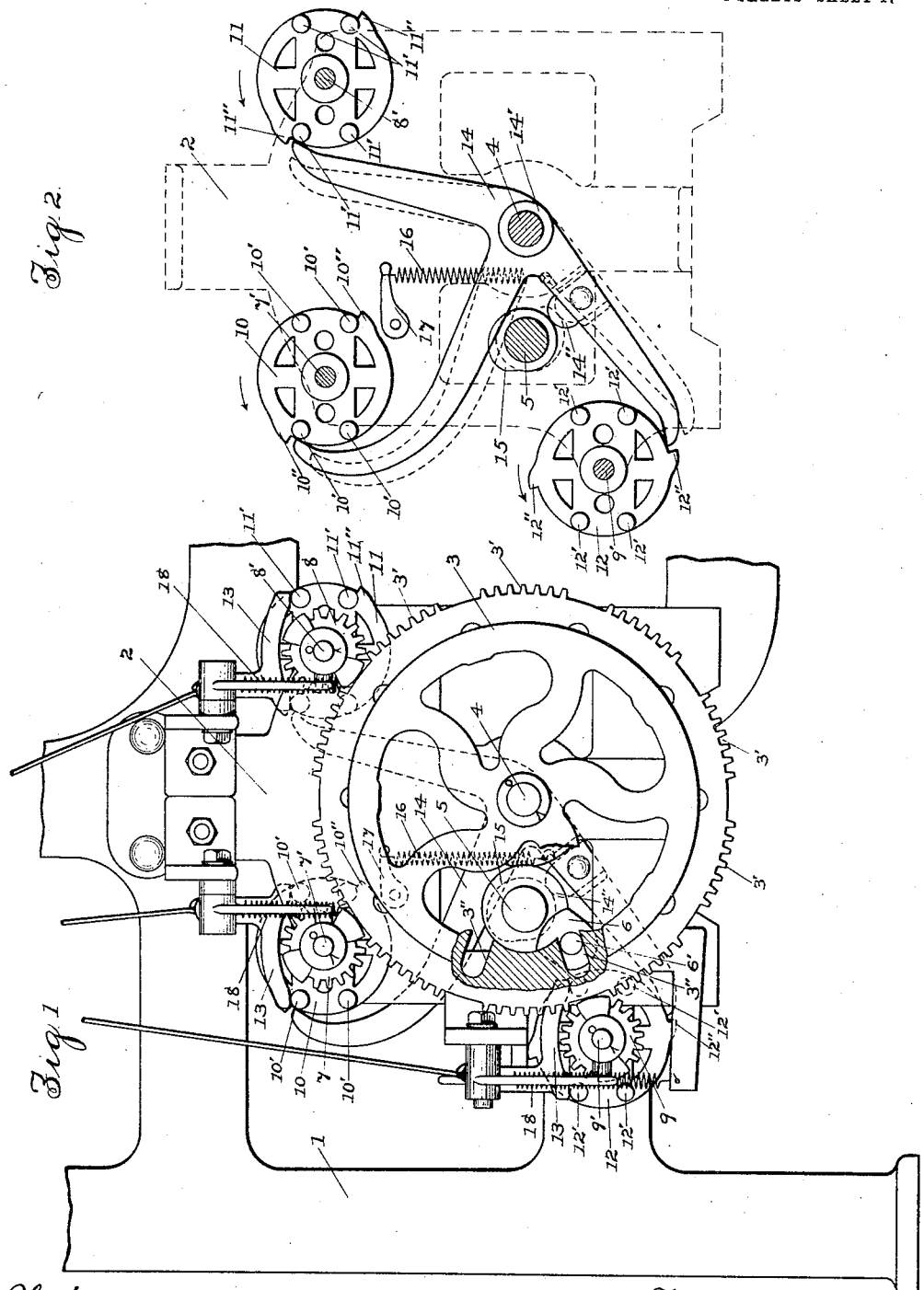
Witnesses
H. F. Lang.
M. Heass.
Inventor
A. A. Gordon Jr.
By John C. Dewey
Attorney No. 764,888. PATENTED JULY 12, 1904.
A. A. GORDON, Jr.
SHUTTLE BOX MOTION FOR LOOMS.
APPLICATION FILED APR. 30, 1904.
NO MODEL. 4 SHEETS—SHEET 2.
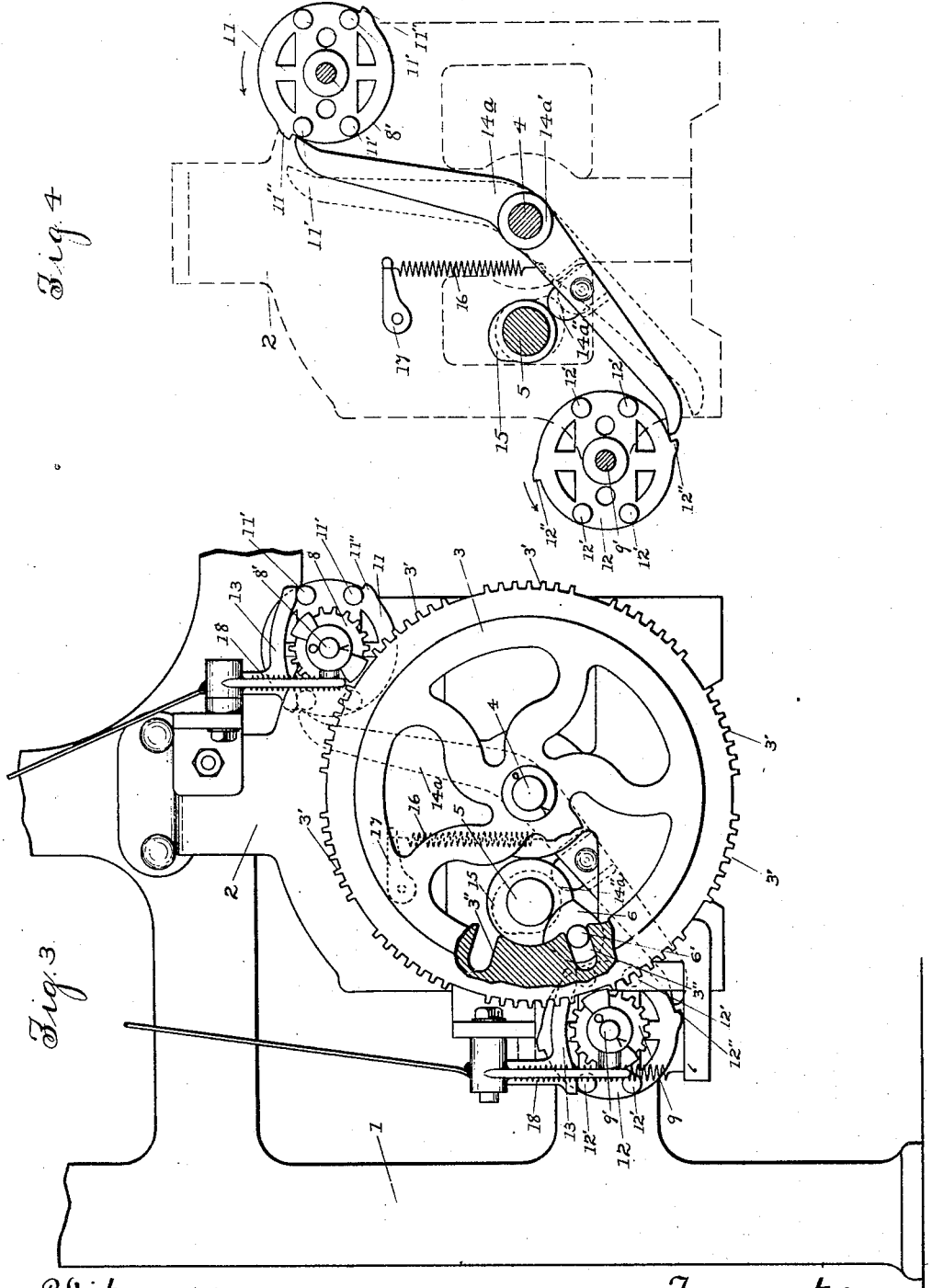
Witnesses
H. F. Lang
M. Haas
Inventor
A. A. Gordon Jr.
By John C. Dewey
Attorney

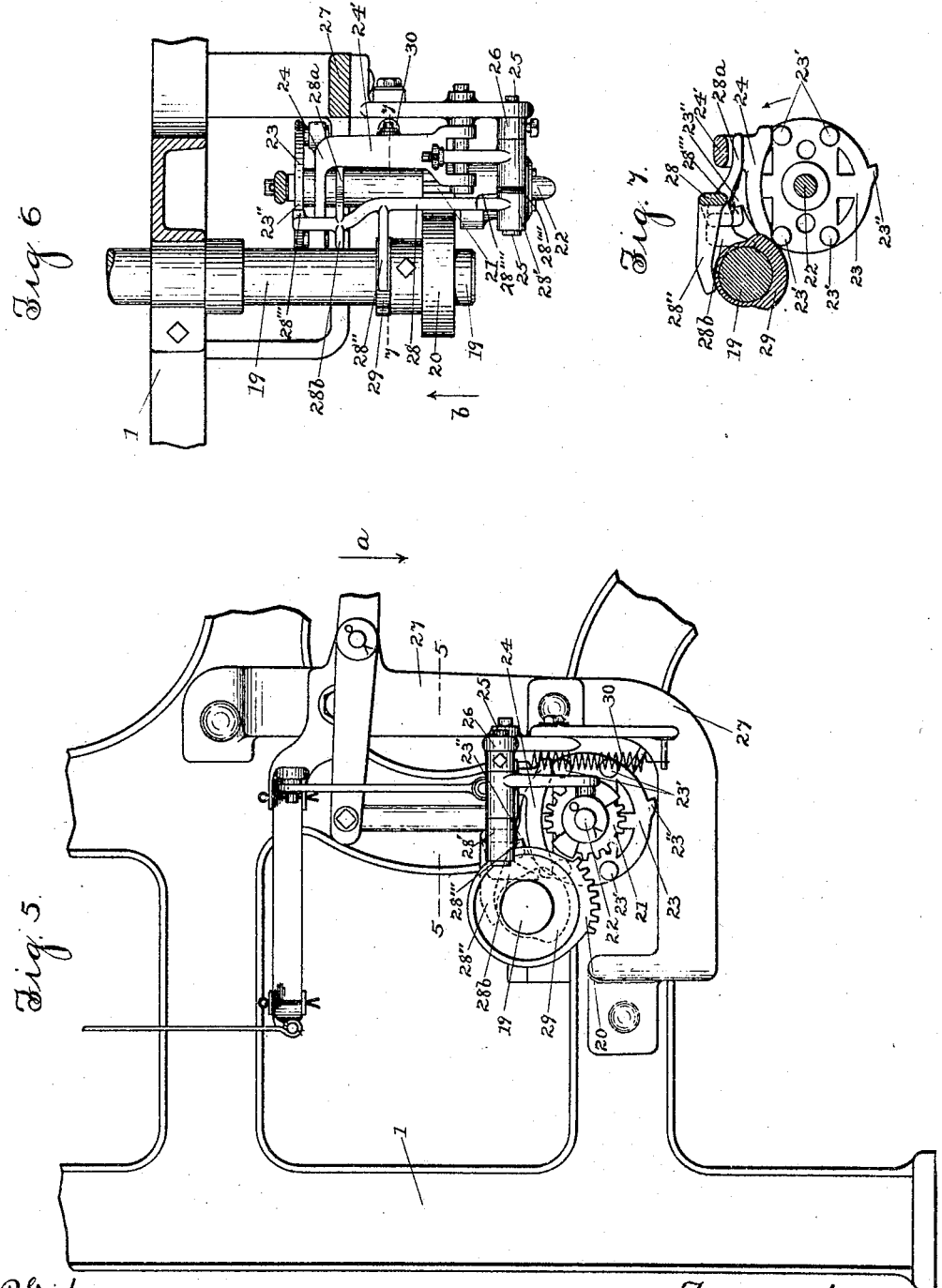

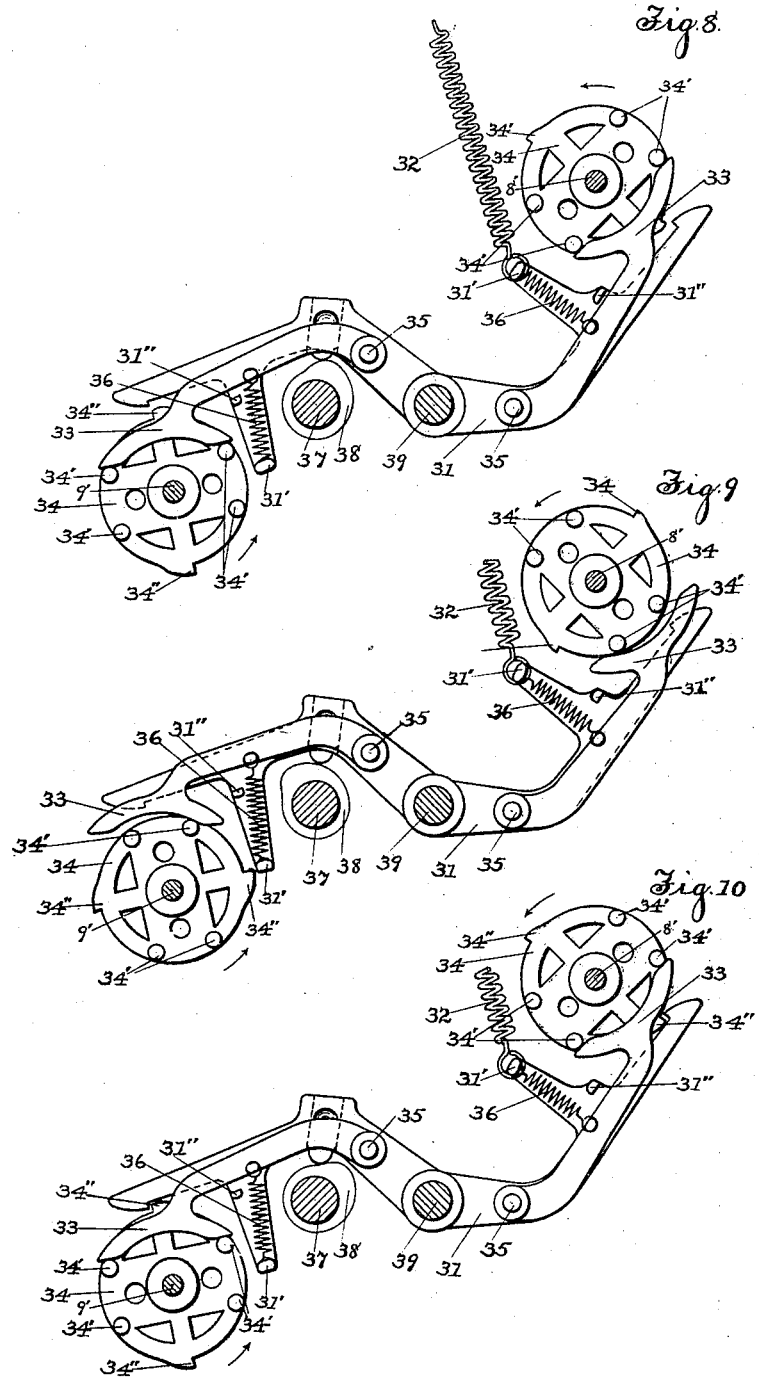

No. 764,888. Patented July 12, 1904.

UNITED STATES PATENT OFFICE.

ALBERT A. GORDON, JR., OF WORCESTER, MASSACHUSETTS, ASSIGNOR TO CROMPTON & KNOWLES LOOM WORKS, A CORPORATION OF MASSACHUSETTS.

SHUTTLE-BOX MOTION FOR LOOMS.

SPECIFICATION forming part of Letters Patent No. 764,888, dated July 12, 1904.

Application filed April 30, 1904. Serial No. 205,665. (No model.)

*To all whom it may concern:*

Be it known that I, ALBERT A. GORDON, Jr., a citizen of the United States, residing at Worcester, in the county of Worcester and State of Massachusetts, have invented certain new and useful Improvements in Shuttle-Box Motions for Looms, of which the following is a specification.

My invention relates to shuttle-box motions for looms, and particularly to that class of shuttle-box motions shown and described in United States Letters Patent No. 364,697, in which there is a master-wheel and means for rotating it intermittently and one or more pinions, according to the number of shuttle-boxes rotated by the master-wheel in accordance with the indications of the pattern-surfaces of the box-pattern chain, and intermediate connections to the shuttle-box lever, comprising as a part thereof a plate having thereon a crank or an eccentric, all as fully shown and described in said patent, to which reference is made.

In practice in the class of shuttle-box motions referred to the pinions and the shafts on which they are secured and the cranks and eccentrics have a very quick movement every time they are rotated and there is a tendency for them to rotate too much instead of stopping at the end of each partial rotation.

The object of my invention is to provide a supplemental device termed a "stop-lever," combined with the parts of the shuttle-box motion shown and described in said Patent No. 364,697, for positively stopping the movement of the pinions, the shaft on which said pinions are secured, and the cranks and eccentrics at the proper time and prevent any further forward movement thereof.

I have shown in the drawings my improvements applied to a two, four, and six shuttle box motion of the class referred to.

I have only shown in the drawings a detached portion of some of the parts of the shuttle-box motion shown in Fig. 1 of said Patent No. 364,697, sufficient to illustrate the nature of my improvements combined therewith.

Referring to the drawings, Figure 1 is a front side view and partial section of a detached portion of some of the parts of a six-shuttle-box motion of the class referred to and my improvements combined therewith. Fig. 2 corresponds to Fig. 1, but the master-gear and pinions and some other parts are left off. Fig. 3 corresponds to Fig. 1, but shows my improvements combined with a four-shuttle-box motion. Fig. 4 corresponds to Fig. 2, but shows my improvements for a four-shuttle-box motion. Fig. 5 corresponds to Figs. 1 and 3, but shows my improvements combined with a two-shuttle-box motion. Fig. 6 is a sectional plan view of the parts shown in Fig. 5, taken at a point indicated by line 5 5, same figure, looking in the direction of arrow $a$. Fig. 7 is a detached section on line 7 7, Fig. 6, looking in the direction of arrow $b$, same figure. Fig. 8 shows a modified construction of my improvements. Fig. 9 corresponds to Fig. 8, but shows the parts in a different position; and Fig. 10 corresponds to Figs. 8 and 9, but shows the parts in a different position.

My improvements relate only to a supplemental device combined with some of the parts of the shuttle-box motion shown and described in said Patent No. 364,697, which are of well-known construction and operation, and therefore it will not be necessary to describe in detail the construction and operation of said parts, but only to describe the same sufficiently to enable those skilled in the art to which my invention belongs to make and use the same.

In the accompanying drawings, Figs. 1 and 2, 1 is a portion of the loom side or frame. 2 is a bracket or stand secured to the loom-frame 1 to support the several parts of the box motion. 3 is the master-wheel, loosely mounted on a stud 4 on the bracket 2, with its teeth 3' in this instance in a series of seven. 5 is the bottom or cam shaft and has fast thereon an arm 6, carrying a pin 6', adapted to enter slots 3'' in the interior surface of the master-wheel 3 and move it intermittently. The teeth 3' on the master-wheel 3 are adapted to engage with the teeth on the three pinions 7, 8, and 9, to communicate a half-rotation to each pinion, and then run out of gear and leave each pinion at rest. The rotation of each pinion 7, 8, and 9 by the master-gear 3 is controlled by the indications of the box-pattern chain (not shown) through intermediate connections to said pinions, some of which are shown in Fig. 1 and which need not be described, as they form no part of my invention and are fully shown and described in said Patent No. 364,697. Each of said pinions 7, 8, and 9 is fast on its supporting-shaft 7', 8', and 9', respectively, which shafts are mounted in suitable bearings on the bracket 2. Fast on the shaft 7' is a plate 10, carrying a crank, (not shown,) fast on the shaft 8' is a plate 11, carrying a crank, (not shown,) and fast on the shaft 9' is a plate 12, carrying a crank, (not shown.) Each of these plates 10, 11, and 12 has in this instance pins 10', 11', and 12' thereon, respectively, which are adapted to be engaged by a holder 13, (equivalent to holder $e^7$ of said patent,) and said holder 13 is held down by a spring 18. The holders 13 act to prevent the plates 10, 11, and 12 and the shafts 7', 8', and 9' from rebounding when stopped by the disengagement of the teeth 3' on the master-gear 3 with the teeth of the pinions 7, 8, and 9.

All of the above-mentioned parts may be of the ordinary and well-known construction, and are fully shown and described in said Patent No. 364,697.

I will now describe my improvements shown in Figs. 1 and 2, adapted to be used with a six-shuttle-box motion. On the axis-stud 4 of the master-gear 3 is loosely mounted the hub 14' of a three-arm lever 14, termed a "stop-lever." One arm of the lever 14 has an engaging surface 14'', preferably adjustably secured thereon and extending in the path of and adapted to be engaged by a cam 15, fast on the bottom shaft 5. A spring 16, attached to the lever 14 and to a stand 17, acts to hold the surface 14'' in yielding engagement with the cam 15 and also to hold the ends of the three arms of the lever 14 in yielding engagement with the peripheries of the three plates 10, 11, and 12, respectively. Each of the plates 10, 11, and 12 has in this instance two projections 10'', 11'', and 12'', respectively, on its periphery diametrically opposite each other. The projections 10'', 11'', and 12'' act as stops and are engaged by the free ends of the three-arm lever 14, as shown by full lines in Fig. 2, to prevent any forward rotation of the plates 10, 11, and 12 until in the regular rotation of the bottom shaft 5 and the cam 15 fast thereon the engaging surface 14'' is engaged by the cam portion of said cam 15, and the three-arm lever 14 is moved against the action of the spring 15 into the position shown by broken lines in Fig. 2, leaving the plates 10, 11, and 12 and the shafts 7', 8', and 9' and pinions 7, 8, and 9 thereon free to be rotated by the master-gear 3 in the usual way. Immediately on the passing of the cam-surface on the cam 15 away from the engaging surface 14'' on the lever 14 the spring 16 is free to act to move the ends of the lever 14 back into engagement with the plates 10, 11, and 12, so that on the continued rotation of said plates the ends of the lever 14 will be in front of the stops or projections 10'', 11'', and 12'' on said plates, as shown by full lines in Fig. 2, and prevent any further forward rotation of the plates and the shafts, on which they are secured, and the pinions on said shafts.

Referring to Figs. 3 and 4, I have shown in said figures my improvements combined with a four-shuttle-box motion. I have designated in said Figs. 3 and 4 the parts similar to the parts shown in Figs. 1 and 2 by the same figures of reference.

The stop-lever 14 of Figs. 1 and 2 is designated as $14^a$ in Figs. 3 and 4. Said lever $14^a$ has only two arms, as shown.

The operation of the stop-lever $14^a$ in Figs. 3 and 4 is the same as the operation of the stop-lever 14 of Figs. 1 and 2.

Referring to Figs. 5, 6, and 7, I have shown in said figures my improvements combined with a two-shuttle-box motion, and as the construction and arrangement of the parts of said motions are somewhat different from the four and six shuttle box motion of Figs. 1, 2, 3, and 4, I will briefly describe the same. On the bottom or cam shaft 19 is fast a mutilated gear 20, which meshes with and rotates a pinion 21, fast on a shaft 22. Also fast on the shaft 22 is a plate 23, carrying a crank and having pins 23' thereon to be engaged by the holder 24. On the periphery of the plate 23 are two projections 23'' diametrically opposite each other, forming stops. On a pin 25, supported in the outer end of a stand 26, secured to the stand 27, is the hub 28' of a lever 28, which has a side extension 28'', which extends over and is in the path of a cam 29, fast on the shaft 19. The free end of the lever 28 has a downwardly-extending projection 28''' thereon, which is adapted to extend in front of the projections 23'' on the plate 23. (See Fig. 7.) The lever 28 preferably has a second side extension $28^a$, which extends under the pivoted arm 24' of the holder 24, so that when the lever 28 is raised by the cam 29, through the extension 28'', engaged by said cam, the extension $28^a$ under the arm 24' of the holder 24 will be raised and caused to engage and raise the arm 24' of the holder 24 to disengage the holder 24 from the pins 23' on the plate 23 and allow of the free rotation of said plate. A spring 30, attached to the arm 24' and to a pin 30', (see Fig. 5,) acts to hold the holder 24 in yielding engagement with the pins 23' on the plate 23. A spring 28'''', coiled on the pin 25 and engaging the lever 28, acts to hold the end 28'' thereof in yielding engagement with the plate 23. (See Fig. 6.) An oppositely-extending side extension 28ᵇ on the lever 28 bears against the shaft 19 and acts to hold said lever 28 in proper lateral position.

Referring to Figs. 8, 9, and 10, I have shown in said figures a modified construction of my stop-lever as shown in the other figures. In said Figs. 8, 9, and 10 the two-arm stop-lever 31, provided with a spring 32, has mounted thereon two holders 33, corresponding to the holders shown in the other figures of the drawings for engaging the pins 34' on the plates 34. Each holder 33 is pivotally mounted on a pin 35 on the lever 37 and actuated by a spring 36, attached at one end to the holder 33 and at its other end to an extension 31' on the lever 31. A stop 31" on the extension 31' limits the action of the spring 36. In Fig. 8 it will be seen that through cam 38 the lever 31 is moved, as shown in said figure, and the plates 34 are free to rotate, with the lever 31 in the position shown. It will also be seen that the tension of the spring 36 is lessened or eased by the movement of the lever 31, allowing an easier movement of the plates 34 against the action of the holders 33 on the pins 34', as shown in Fig. 9. When the cam 38 on the shaft 37 has passed from under the projection on the lever 31, as shown in Fig. 10, to allow the ends of said lever to extend in front of the projections 34" on the plates 34, the tension of the spring 36 on the holders 33 is increased, causing said holders to press harder against the pins 34' on the plates 34, and thus tend to stop and hold at rest said plates.

It will be understood that the details of construction of my improvements may be varied, if desired.

Having thus described my invention, what I claim as new, and desire to secure by Letters Patent, is—

1. In a shuttle-box motion for looms of the class described, the combination with a rotary plate, of a lever adapted to engage said plate to stop the forward movement thereof, and means for positively moving said lever out of engagement with said plate, substantially as shown and described.

2. In a shuttle-box motion for looms of the class described, the combination with a rotary plate, of a pivoted lever adapted to engage said plate to stop the forward movement thereof, and means for positively moving said lever out of engagement with said plate, substantially as shown and described.

3. In a shuttle-box motion for looms of the class described, the combination with a rotary plate, of a lever adapted to engage said plate to stop the forward movement thereof, and means for positively moving said lever out of engagement with said plate, and holding it in yielding engagement with said plate, substantially as shown and described.

4. In a shuttle-box motion for looms of the class described, the combination with a rotary plate having projections on its periphery, of a lever adapted to engage said projections, to stop the forward movement of said plate, and means for positively moving said lever out of engagement with said plate, substantially as shown and described.

5. In a shuttle-box motion for looms of the class described, the combination with a rotary plate, and a spring-actuated holder to engage said plate, of a pivoted lever adapted to engage said plate to stop the forward movement thereof, and means for positively moving said lever out of engagement with said plate and for moving said holder with said lever, substantially as shown and described.

6. In a shuttle-box motion for looms of the class described, the combination with a rotary plate, of a pivoted lever adapted to engage said plate, to stop the forward movement thereof, and a holder to engage said plate pivotally mounted on said lever, and a spring for actuating said holder, and means for positively moving said lever out of engagement with said plate, substantially as shown and described.

ALBERT A. GORDON, Jr.

Witnesses:
J. C. Dewey,
M. Haas.